United States Patent [19]

Brown et al.

[11] Patent Number: 4,552,668

[45] Date of Patent: Nov. 12, 1985

[54] OXIDATION OF SULFIDES IN POLYMER-THICKENED AQUEOUS SOLUTION

[75] Inventors: Richard A. Brown, Trenton; Robert D. Norris, Cranbury, both of N.J.

[73] Assignee: FMC Corporation, Philadelphia, Pa.

[21] Appl. No.: 635,870

[22] Filed: Jul. 30, 1984

[51] Int. Cl.⁴ .......................... C02F 1/76; C09K 3/00
[52] U.S. Cl. ...................................... 210/759; 166/300; 210/763; 252/8.55 D; 252/8.55 R; 423/224; 423/DIG. 19
[58] Field of Search ................ 166/300; 210/758–763; 423/224, DIG. 19; 252/8.55 D, 8.55 R

[56] References Cited

U.S. PATENT DOCUMENTS

| | | | |
|---|---|---|---|
| 2,767,167 | 10/1956 | Opie et al. | 260/209 |
| 2,917,428 | 12/1959 | Hitzman | 167/22 |
| 3,530,067 | 9/1970 | Friedman | 210/15 |
| 3,634,232 | 1/1972 | Dunlop | 252/8.55 D |
| 3,705,098 | 12/1972 | Shepherd et al. | 210/63 |
| 3,757,861 | 9/1973 | Routson | 166/273 |
| 4,014,801 | 3/1977 | Fullinwider et al. | 252/8.55 D |
| 4,089,788 | 5/1978 | McCarthy | 252/8.55 D |
| 4,144,179 | 3/1979 | Chatterji | 252/8.55 R |
| 4,213,934 | 7/1980 | Bellos et al. | 252/8.55 D |
| 4,218,327 | 8/1980 | Wellington | 252/8.55 D |
| 4,224,151 | 9/1980 | Jost | 423/224 |
| 4,292,293 | 9/1981 | Johnson et al. | 423/571 |
| 4,361,487 | 11/1982 | Hills et al. | 423/224 |
| 4,363,215 | 12/1982 | Sharp | 423/224 |
| 4,388,194 | 6/1983 | Hills | 423/231 |
| 4,440,651 | 4/1984 | Weisrock | 252/8.55 D |

OTHER PUBLICATIONS

Kibbel, Jr. et al., "Hydrogen Peroxide for Industrial Pollution Control," *Industrial Wastes*, Nov./Dec. 1972.
Walling, *Free Radicals in Solution*, John Wiley & Sons, New York (1957), pp. 35–36.

*Primary Examiner*—Andrew H. Metz
*Assistant Examiner*—Terryence Chapman
*Attorney, Agent, or Firm*—Richard E. Elden; Robert L. Andersen

[57] ABSTRACT

A method for preferentially oxidizing sulfide in a viscous, aqueous solution of a hydratable polymeric material suitable for use in hydraulically treating subterranean formations.

45 Claims, No Drawings

OXIDATION OF SULFIDES IN POLYMER-THICKENED AQUEOUS SOLUTION

This invention relates to the use of hydrogen peroxide for oxidizing sulfides in polymer-thickened aqueous fluids useful for hydraulic treatment of subterranean formations.

Sulfates are contained in sea water and in waters which rise from, or pass through, sulfate-bearing strata in the earth or waters that are drawn from streams into which sulfates are introduced as agricultural, urban, or industrial wastes. When such sulfate-bearing waters are confined under anaerobic or near anaerobic conditions, the sulfates are reduced to sulfides with the formation of hydrogen sulfide gas. This hydrogen sulfide production occurs from the action of ubiquitous sulfate-reducing anaerobic bacteria (e.g. *Desulfovibro desulfricans*).

The presence of sulfides is in general undesirable in aqueous fluids for many reasons. The hydrogen sulfide gas emitted from such solution is environmentally unacceptable and constitutes a health hazard. Also the solutions containing sulfides are corrosive to metals and can precipitate metal sulfides which may plug subterranean formations.

The use of hydrogen peroxide to abate sulfide pollution is well established. Examples of this peroxide application can be found in an article by Kibbel et al, "Hydrogen Peroxide for Industrial Pollution Control", *Industrial Wastes*, November/December 1972 and U.S. Pat. No. 3,705,098 to Sheperd et al and U.S. Pat. No. 4,361,487 to Hills et al, all three of which are incorporated herein by reference.

Hydratable polymeric materials are frequently used in subterranean formations to increase the viscosity of aqueous solutions, particularly in petroleum production operations such as well completion, fracturing and waterflood operations, either to prevent the premature loss of the hydraulic liquid, or to assist in suspending solid particles in the liquid. Such solid particles may be used as propping agents in a fracture; the solid particles may also be used to form either an impervious consolidated pack in contact with a formation to seal off a porous formation or a permeable pack to retain solid particles within unconsolidated formation.

Subterranean formations suitable for treatment by the method of the present invention may often be those which are accessible by a borehole into the earth. However, the method is equally suitable for use with more accessible formations where anaerobic conditions may exist.

A wide variety of hydratable polymeric materials has been found useful as thickening agents in such aqueous compositions. These include hydratable polysaccharides, polyacrylamides, and polyacrylamide copolymers. Particularly desirable polysaccharides include galactomannan gums, derivatives thereof, and cellulose derivatives. Typical polysaccharides include: guar gums, locust bean gum, karagya gum, sodium carboxymethyl guar, hydroxyethyl guar, hydroxypropyl guar, sodium hydroxymethyl cellulose, sodium carboxymethyl-hydroxyethyl cellulose, and hydroxyethyl cellulose.

Optionally, cross-linking agents may be added which increase the maximum temperature at which the hydratable polymers will retain the desired high viscosity. These cross-linking agents are well known in the art and include polyvalent metal ions, such as chromium (III), aluminum (III), titanium (IV) and polyvalent anions, such as borates.

The viscosity of aqueous solutions formulated with such hydratable polymeric materials can be reduced or broken by the use of chemical additive "breakers", such as enzymes, acids, and strong oxidizing agents. Persulfates and activated peroxygen compounds are frequently used as breaking agents because they readily form effective free radicals under the usual conditions of use and leave no objectionable residue to cause disposal problems. Reducing agents, such as sulfites and sulfides, are known to be effective as activators for peroxygen breakers. Until the present invention, the introduction of a peroxygen into an aqueous solution containing both a sulfide and a hydratable polymer resulted in an undesired depolymerization of the polymer.

The object of the present invention is to preferentially oxidize a sulfide contained in a viscous aqueous solution suitable for hydraulic treatment of a subterranean formation without necessarily effecting a significant reduction of the viscosity of the solution.

Another object of the present invention is to oxidize a sulfide contained in a viscous aqueous solution suitable for hydraulic treatment of a subterranean formation and controllably reducing the viscosity of the solution.

The present invention is a method for controllably and preferentially oxidizing a sulfide in a viscous, aqueous solution containing from 1 to 100 kilograms per cubic meter of a hydratable polymeric material rather than depolymerizing the polymeric material. The process comprises the steps of adjusting the pH of the aqueous solution between pH 3 and pH 10, and incorporating into the solution from 0.1 to 5 parts by weight of a free radical scavenger per hundred parts by weight of the aqueous solution together with sufficient hydrogen peroxide to react with at least part of the sulfide present. Optionally, a transitional metal may be incorporated into the aqueous solution as a peroxygen activator.

It is not critical how the hydrogen peroxide is incorporated into the solution. The hydrogen peroxide may be added as an aqueous solution by adding a compound which liberates hydrogen peroxide on contacting an aqueous solution or by the cathodic reduction of oxygen. Compounds which liberate hydrogen peroxide include compounds such as an amine hydroperoxide, sodium perborate, sodium carbonate peroxide, urea peroxide, melamine peroxide, sodium pyrophosphate peroxide, calcium peroxide, magnesium peroxide, sodium peroxide, and zinc peroxide. Hydrogen peroxide may be generated within an aqueous solution by introducing oxygen gas into the solution and passing an electric current between an anode and a cathode immersed in the solution, thereby reducing the oxygen to hydrogen peroxide at the cathode. Surprisingly, the viscosity of a viscous, aqueous solution treated by the process of the present invention is more stable than the viscosity of a similar untreated solution.

U.S. Pat. No. 4,361,487 to Hills et al teaches that the amount of hydrogen peroxide required to react with a sulfide varies with pH. At pH 7 or less only one mol of hydrogen peroxide is required per mol of sulfide. At more than pH 8.2, four mols of hydrogen peroxide are required per mol of sulfide, and between pH 7 and pH 8.2 the hydrogen peroxide required increases from one mol to four mols. However, in the pH range of 7 to 9, and in the presence of a catalytic quantity of vanadate ion, only one mol of hydrogen peroxide is required per mol of sulfide. The quantity of vanadium catalyst required is not critical but in general an amount greater than 0.5 mg per kilogram of solution is desirable to insure a reasonable reaction rate, and an amount less than 2 mg per kilogram of solution is desirable for economic reasons.

The free radical scavengers for peroxygens are well-known and the efficacy of a compound as a peroxygen free radical scavenger is known to vary markedly with the system in which it is used, according to C. Walling, *Free Radicals in Solution,* John Wiley & Sons, New York: (1957), page 36. Free radical scavengers suitable for peroxygen systems include aromatic hydroxy compounds, amines, and polymerizable monomers which do not tend to form long chains. The latter include unsaturated alcohols and allylic compounds. Compounds capable of both complexing a metal ion and acting as an inhibitor may be used. Such compounds include: allyl alcohol, phenol, catechol, and 1,10-orthophenanthroline.

The usage rate of the free radical scavengers will vary according to the efficacy of the compounds and the desired condition of use. Generally, from 0.01 to 2 parts of a free radical scavenger is added per hundred parts of the aqueous solution; preferably 0.05 to 0.5 parts of the scavenger is added per hundred parts of aqueous solution.

The activator may be any soluble metal atom or ligand and a metal atom, said metal atom being capable of existing in the solution in first and second oxidation states in the aqueous composition. The metal atom may be present as a metal ion or as a coordination compound of said metal atom with a single dentate ligand or a chelate formed by a multidentate ligand. It is to be considered that the oxygen in a compound, such as vanadium oxysulfate, functions as a ligand to the metal atom and is within the scope of the present invention. The metal atom may be of any transitional metallic element capable of existing in the solution as an ion or forming a coordination compound, and which metal atom will react with the peroxygen to initiate free radical formation. Desirably, the metal atom will be selected from Group IB, Group VIB, Group VIIB and Group VIII of the periodic table. Preferably, the metal atom is a member of the group consisting of iron, copper, and vanadium.

There are several advantages to the use of a coordination compound instead of the metal atom with the same oxidation number. The electrochemical potential can be altered by the choice of the ligand, the maximum concentration of the metallic element can be increased, particularly in the higher pH ranges, and the composition of the aqueous solution is less sensitive to a change in pH or by reaction with compounds likely to be encountered during use.

Although the mechanism for the invention has not been established, it is convenient to assume that presence of a free radical trap interferes with the rate of formation and propagation of free radicals but does not interfere with the rate of oxidation of sulfide. As both rates are known to be temperature dependent one skilled in the art will readily recognize that temperature is not a critical factor in the present invention. Instead by adjusting the quantity of free radical trap and if desired adding a peroxygen activator, it is possible to practice the invention over the temperature range of 0° C. to 60° C. or higher.

The following examples are presented to illustrate the best mode of practicing the invention but are not to be construed to limit the invention to the examples.

The experimental procedures used in the examples were variations of the following generalized example. Modifications are specified in the respective examples.

EXAMPLE 1

Viscous solutions were prepared containing 1.4 g of hydroxypropylguar (Celanese Corp.) in 380 ml water after one hour sulfide, hydrogen peroxide, free radical trap (inhibitor) and activators were added as indicated in Table I.

The viscosity and sulfide were determined periodically. Viscosities were measured with a Brookfield RVT viscometer using a number one spindle at 10 LC.

Table I indicates the effect inhibitors and activators have on the oxidation of sulfide in the presence of a guar gel. $H_2O_2$ alone has no effect on the solution viscosity in the absence of sulfide as shown by Run 3. However, when sulfide is present the addition of peroxide, while destroying 92% of the sulfide, also results in a 79% reduction in viscosity. The sulfide, as a reducing agent, accelerates the reaction between $H_2O_2$ and the polymer. The addition of a free radical scavenger in Runs 5 to 7 prevented a reduction of viscosity of the solutions. However, sulfide abatement was diminished to 64-83% versus 92%. Both phenol and allyl alcohol were effective as inhibitors. However, allyl alcohol (Run 7 vs 5) provided better protection for the polymer while retarding sulfide oxidation less. Some further improvement was obtained in Run 7 by sequential addition of $H_2O_2$.

The use of a metal activator in combination with an inhibitor, Runs 8-11 provided the best combination of polymer protection and sulfide abatement. Both complexed iron (ferroin) and uncomplexed copper ($CuSO_4$) were effective. Allyl alcohol (Run 9) gave better performance than phenol (Run 8). Copper (Runs 10 and 11) was also better than iron (Run 9), although either in combination with allyl alcohol gave very good results. The best results were obtained using allyl alcohol, copper sulfate, and sequential addition of $H_2O_2$. In this case, 100% of the viscosity was maintained while sulfide abatement was 94% complete immediately after the last $H_2O_2$ addition.

EXAMPLE 2

Runs 12-22 were conducted using Cort 320 TM acrylamide polymer and synthetic Coalinga Nose Unit water containing KCl, 40; $CaCl_2$, 28; $NaHCO_3$, 1500; $Na_2SO_4$, 250; NaCl, 500. A concentrate containing 5000 mg Cort 320 TM prepared and diluted to 700 mg/L as needed. The diluted solution had a viscosity of 21 cps on the Brookfield viscometer (spindle No. 1) at 10 rpm and of 10 cps at 600 rpm (4 cps at 300 rpm) on a Baroid rheometer. Samples containing 30 mg sulfide/mg were treated as indicated in Table II.

Run 12 shows that abatement of sulfide using $H_2O_2$ alone results in appreciable loss in viscosity. Inclusion of an inhibitor protects the polymer. In Run 13, addition of 1.8 g of allyl alcohol resulted in a 100% retention of viscosity with a small reduction in the degree of sulfide abatement. On the other hand, addition of 0.002 g of iron resulted in a greater loss of viscosity and a greater extent of sulfide abatement (Run 14). Combining allyl alcohol and iron, Run 15, gave excellent results, viscosity retention was 91% while 97% of the sulfide was destroyed. In fact, polymer stability was better under these conditions than in the absence of $H_2O_2$ (Run 16).

EXAMPLE 3

Stability tests were conducted on a control 700 mg/L polymer solution and solutions to which sulfide was added and oxidized with peroxide. The samples were degassed for two hours using nitrogen, sealed, and heated to 90° C. Samples were cooled to room temperature for viscosity measurements, degassed, and reheated. Results are presented in Table III.

An important consideration in applying this invention is subequent polymer stability in the formation. Table III shows a comparison of polymer stability of a fresh Cort 320 ™ polymer solution contain no additives with the solution from Run 21. Surprisingly, the polymer stability was greater for the treated sample from Run 21 than for the control sample without additions.

polyacrylamides, polyacrylamide copolymers, and mixtures thereof comprising the steps of
  a. adjusting the pH of the aqueous solution between pH 3 and pH 10, and
  b. incorporating into the aqueous solution
    i. from 0.01 to 5 parts by weight of a free radical scavenger per hundred parts by weight of the aqueous solution, and
    ii. sufficient hydrogen peroxide to react with at least part of the sulfide present in the aqueous solution.

2. The method of claim 1 wherein the pH of the aqueous solution is adjusted between pH 3 and pH 7 and approximately one mol of hydrogen peroxide is added per mol of hydrogen sulfide to be oxidized.

3. The method of claim 2 wherein an effective amount of a transition metal activator is incorporated into the aqueous solution.

TABLE I

Oxidation of Sulfides in the Presence of a Guar Gel

| Run No. | $H_2O_2$ ppm | Inhibitor | Activator | % Of Original Viscosity Remaining at (Hrs) | | | | | % Sulfide Loss at Hours | | | |
|---|---|---|---|---|---|---|---|---|---|---|---|---|
| | | | | .25 | .50 | .75 | 1 | 4 | .25 | .5 | .75 | 1 |
| 1 | No | No | No | 100 | 100 | 100 | 100 | 100 | None Present | | | |
| 2 | No | No | No | 100 | 100 | 100 | 100 | 80 | 0 | 0 | 0 | 0 |
| 3 | 117 | No | No | 100 | 100 | 100 | 100 | 100 | None Present | | | |
| 4 | 117 | No | No | 28 | 24 | 21 | — | — | 67 | 91 | 92 | — |
| 5 | 117 | A | No | 80 | 74 | 64 | 65 | — | 44 | 50 | 64 | 77 |
| 6 | 117* | A | No | 83 | 77 | 72 | 68 | — | 25 | 30 | 65 | 85 |
| 7 | 117 | B | No | 78 | 76 | 76 | 79 | — | 70 | 80 | 83 | 85 |
| 8 | 117 | A | C | 74 | 67 | 67 | 67 | — | 75 | 86 | — | — |
| 9 | 117* | B | C | 96 | 94 | 94 | 92 | 88 | 35 | 45 | 73 | 86 |
| 10 | 117 | B | D | 95 | 97 | 98 | 100 | 99 | 83 | 93 | 95 | 97 |
| 11 | 117* | B | D | 100 | 100 | 100 | 100 | — | 65 | 85 | 91 | 94 |

A = Phenol (3.0 g)
B = allyl alcohol (4 ml)
C = Ferroin (.05 ml)
D = $CuSO_4$ (.01 g)
*Staged addition of $H_2O_2$

TABLE II

Sulfide Oxidation in Presence of Cort 320 Acrylamide Polymer

| Run No. | $H_2O_2$ g/380 ml | Inhibitor g/380 ml | Activator g/380 ml | % Of Original Viscosity Remaining At Hours | | | | | | % Sulfide Destroyed At Hours | |
|---|---|---|---|---|---|---|---|---|---|---|---|
| | | | | .5 | 1 | 2 | 3 | 7 | 17 | 1 | 4 |
| 12 | 0.018 | No | No | 91 | 82 | 73 | 82 | 82 (58) | — | 86 | 90 |
| 13 | 0.018 | 1.8 | 0 | 100 | 100 | 100 | 100 | 100 (90) | — | 70 | 86 |
| 14 | 0.018 | 0 | .002 | 82 | 64 | 55 | 55 | 64 | — | 92 | 96 |
| 15 | 0.018 | 1.8 | .002 | 100 | 92 | 82 | 91 | 91 | 91 (80) | 90 | 97 |
| 16 | 0 | 0 | 0 | 100 | 91 | 82 | 91 | 82 | 82 (59) | 0 | 0 |
| 17 | 0.018 | 0.018 | .002 | 90 | 90 | 80 | 75 | 70 (54) | | 99 | — |
| 18 | 0.018 | 0.035 | .002 | 100 | 85 | 80 | 75 | 70 (24) | | 100 | — |
| 19 | 0.018 | 0.090 | .002 | 100 | 95 | 95 | 90 | 90 (71) | | 99 | — |
| 20 | 0.018 | 0.180 | .002 | 100 | 95 | 89 | 89 | 85 (62) | | 99.5 | — |
| 21 | 0.013 | 0.035 | .002 | 100 | | | | | 95 (46) | 87 | |
| 22 | 0.013 | 0.090 | .002 | 100 | | | | | 100 (75) | 85 | |

Numbers in parenthesis were obtained with a Brookfield viscosimeter, No. 1 Spindle at 10 rpm.

TABLE III

| | Stability Tests Percent Viscosity Remaining At | | |
|---|---|---|---|
| Sample | 1 day | 4 days | 11 days |
| Control | 70 | 60 | 40 |
| Run 21 | 85 | 100 | 65 |

What is claimed is:

1. A method for oxidizing a sulfide in a viscous, aqueous solution containing from 1 to 100 kg/m³ of a hydratable polymeric material selected from the group consisting of polysaccharides, polysaccharide derivatives, 4. The method of claim 3 wherein the free radical scavenger is selected from the group consisting of aromatic hydroxy compounds, unsaturated alcohols, and allylic compounds.

5. The method of claim 4 wherein the transition metal activator is selected from the group consisting of copper, iron, a coordination compound of copper or iron containing at least one single dentate ligand and a chelate of copper or iron containing at least one multidentate ligand.

6. The method of claim 3 wherein the transition metal activator is selected from the group consisting of copper, iron, a coordination compound of copper or iron containing at least one single dentate ligand and a chelate of copper or iron containing at least one multidentate ligand.

7. The method of claim 2 wherein the free radical scavenger is selected from the group consisting of aromatic hydroxy compounds, unsaturated alcohols, and allylic compounds.

8. The method of claim 7 wherein the transition metal activator is selected from the group consisting of copper, iron, a coordination compound of copper or iron containing at least one single dentate ligand and a chelate of copper or iron containing at least one multidentate ligand.

9. The method of claim 1 wherein the aqueous solution is absent a catalytic quantity of vanadate ion, the pH of the aqueous solution is adjusted between pH 7 and pH 8.2 and more than one mol and less than four mols of hydrogen peroxide is incorporated into the aqueous solution per mol of hydrogen sulfide to be oxidized.

10. The method of claim 9 wherein an effective amount of a transition metal activator is incorporated into the aqueous solution.

11. The method of claim 10 wherein the free radical scavenger is selected from the group consisting of aromatic hydroxy compounds, unsaturated alcohols, and allylic compounds.

12. The method of claim 11 wherein the transition metal activator is selected from the group consisting of copper, iron, a coordination compound of copper or iron containing at least one single dentate ligand and a chelate of copper or iron containing at least one multidentate ligand.

13. The method of claim 10 wherein the transition metal activator is selected from the group consisting of copper, iron, a coordination compound of copper or iron containing at least one single dentate ligand and a chelate of copper or iron containing at least one multidentate ligand.

14. The method of claim 9 wherein the free radical scavenger is selected from the group consisting of aromatic hydroxy compounds, unsaturated alcohols, and allylic compounds.

15. The method of claim 14 wherein the transition metal activator is selected from the group consisting of copper, iron, a coordination compound of copper or iron containing at least one single dentate ligand and a chelate of copper or iron containing at least one multidentate ligand.

16. The method of claim 1 wherein the aqueous solution is absent a catalytic quantity of vanadate ion, the pH of the aqueous solution is adjusted to be pH 8.2 or greater, and approximately four mols of hydrogen peroxide are incorporated into the aqueous solution per mol of hydrogen sulfide to be oxidized.

17. The method of claim 16 wherein an effective amount of a transition metal activator is incorporated into the aqueous solution.

18. The method of claim 17 wherein the free radical scavenger is selected from the group consisting of aromatic hydroxy compounds, unsaturated alcohols, and allylic compounds.

19. The method of claim 18 wherein the free radical scavenger is selected from the group consisting of aromatic hydroxy compounds, unsaturated alcohol, and allylic compounds.

20. The method of claim 17 wherein the transition metal activator is selected from the group consisting of copper, iron, a coordination compound of copper or iron containing at least one single dentate ligand and a chelate of copper or iron containing at least one multidentate ligand.

21. The method of claim 16 wherein the free radical scavenger is selected from the group consisting of aromatic hydroxy compounds,, unsaturated alcohols, and allylic compounds.

22. The method of claim 21 wherein the transition metal activator is selected from the group consisting of copper, iron, a coordination compound of copper or iron containing at least one single dentate ligand and a chelate of copper or iron containing at least one multidentate ligand.

23. The method of claim 1 wherein a catalytic quantity of vanadate ion is incorporated into the aqueous solution, the pH is adjusted between pH 7 and pH 9 and approximately one mol of hydrogen peroxide is incorporated into the aqueous solution per mol of sulfide to be oxidized.

24. The method of claim 23 wherein an effective amount of a transition metal activator is incorporated into the aqueous solution.

25. The method of claim 24 wherein the free radical scavenger is selected from the group consisting of aromatic hydroxy compounds, unsaturated alcohols, and allylic compounds.

26. The method of claim 25 wherein the free radical scavenger is selected from the group consisting of aromatic hydroxy compounds, unsaturated alcohols, and allylic compounds.

27. The method of claim 24 wherein the transition metal activator is selected from the group consisting of copper, iron, a coordination compound of copper or iron containing at least one single dentate ligand and a chelate of copper or iron containing at least one multidentate ligand.

28. The method of claim 23 wherein the free radical scavenger is selected from the group consisting of aromatic hydroxy compounds, unsaturated alcohols, and allylic compounds.

29. The method of claim 28 wherein the transition metal activator is selected from the group consisting of copper, iron, a coordination compound of copper or iron containing at least one single dentate ligand and a chelate of copper or iron containing at least one multidentate ligand.

30. The method of claim 1 wherein an effective amount of a transition metal activator is incorporated into the aqueous solution.

31. The method of claim 30 wherein the free radical scavenger is selected from the group consisting of aromatic hydroxy compounds, unsaturated alcohols, and allylic compounds.

32. The method of claim 31 wherein the transition metal activator is selected from the group consisting of copper, iron, a coordination compound of copper or iron containing at least one single dentate ligand and a chelate of copper or iron containing at least one multidentate ligand.

33. The method of claim 30 wherein the transition metal activator is selected from the group consisting of copper, iron, a coordination compound of copper or iron containing at least one single dentate ligand and a chelate of copper or iron containing at least one multidentate ligand.

34. The method of claim 1 wherein the free radical scavenger is selected from the group consisting of aromatic hydroxy compounds, unsaturated alcohols, and allylic compounds.

35. The method of claim 34 wherein the transition metal activator is selected from the group consisting of copper, iron, a coordination compound of copper or iron containing at least one single dentate ligand and a chelate of copper or iron containing at least one multidentate ligand.

36. A method for oxidizing a sulfide in a viscous, aqueous solution containing from 1 to 100 kg/m$^3$ of a hydratable polymeric material selected from the group consisting of polysaccharides, polysaccharide derivatives, polyacrylamides, polyacrylamide copolymers, and mixtures thereof comprising the steps of
   a. adjusting the pH of the aqueous solution between pH 3 and pH 10, and
   b. incorporating into the aqueous solution
      i. from 0.05 to 0.5 parts by weight of a compound selected from the group consisting of aromatic hydroxy compounds, unsaturated compounds and allylic compounds, and
      ii. sufficient hydrogen peroxide to react with at least part of the sulfide present in the aqueous solution.

37. The method of claim 36 wherein the pH is adjusted between pH 3 and pH 7 and approximately one mol of hydrogen peroxide is added per mol of hydrogen sulfide to be oxidized.

38. The method of claim 36 wherein the aqueous solution is absent a catalytic quantity of vanadate ion, the pH of the solution is adjusted between pH 7 and pH 8.2 and more than one mol and less than four mols of hydrogen peroxide is incorporated into the aqueous solution per mol of hydrogen sulfide to be oxidized.

39. The method of claim 36 wherein the aqueous solution is absent a catalytic quantity of vanadate ion, the pH of the aqueous solution is adjusted to be pH 8.2 or greater, and approximately four mols of hydrogen peroxide are incorporated into the aqueous solution per mol of hydrogen sulfide to be oxidized.

40. The method of claim 36 wherein a catalytic amount of vanadate ion is incorporated into the aqueous solution equivalent to 0.5 to 2 mg of sodium vanadate per kilogram of the aqueous solution, the pH is adjusted between pH 7 and pH 9, and approximately one mol of hydrogen peroxide is incorporated into the aqueous solution per mol of sulfide to be oxidized.

41. A method for oxidizing a sulfide in a viscous, aqueous solution containing from 1 to 100 kg/m$^3$ of a hydratable polymeric material selected from the group consisting of polysaccharides, polysaccharide derivatives, polyacrylamides, polyacrylamide copolymers, and mixtures thereof comprising the steps of
   a. adjusting the pH of the aqueous solution between pH 3 and pH 10, and
   b. incorporating into the aqueous solution
      i. from 0.05 to 0.5 parts by weight of a compound selected from the group consisting of aromatic hydroxy compounds, unsaturated compounds and allylic compounds,
      ii. sufficient hydrogen peroxide to react with at least part of the sulfide present in the aqueous solution, and
      iii. an effective amount of a transition metal activator selected from the group consisting of copper, iron, a coordination compound of copper or iron containing at least one single dentate ligand or a chelate of copper or iron containing at least one multidentate ligand.

42. The method of claim 41 wherein the pH is adjusted between pH 3 and pH 7 and approximately one mol of hydrogen peroxide is added per mol of hydrogen sulfide to be oxidized.

43. The method of claim 41 wherein the aqueous solution is absent a catalytic quantity of sodium vanadate, pH is adjusted between pH 7 and pH 8.2 and more than one mol and less than four mols of hydrogen peroxide is added per mol of hydrogen sulfide to be oxidized.

44. The method of claim 41 wherein the aqueous solution is absent a catalytic quantity of sodium vanadate, pH is adjusted between pH 3 and pH 7 and one mol of hydrogen peroxide is added per mol of hydrogen sulfide to be oxidized.

45. The method of claim 41 wherein a catalytic quantity of vanadate ion is incorporated into the aqueous solution, the pH is adjusted between pH 7 and pH 9 and one mol of hydrogen peroxide is incorporated into the aqueous solution per mol of sulfide to be oxidized.

* * * * *